(12) United States Patent
Ueshima et al.

(10) Patent No.: US 6,368,380 B1
(45) Date of Patent: Apr. 9, 2002

(54) METHOD OF MELT-REMOVING IMPURITY ELEMENTS FROM IRON

(75) Inventors: Yoshiyuki Ueshima, Tokai; Kohsaku Ushioda, Kimitsu, both of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/539,998

(22) Filed: Mar. 30, 2000

(51) Int. Cl.$^7$ ................................................ C21C 7/04
(52) U.S. Cl. .......................................... 75/561; 75/652
(58) Field of Search ..................... 75/652, 10.6, 10.66, 75/561; 420/582

(56) References Cited

U.S. PATENT DOCUMENTS 2,403,419 A * 7/1946 Wilkins et al. ................ 75/652

FOREIGN PATENT DOCUMENTS

| JP | 62053 | 1/1994 |
| JP | 7253400 | 10/1995 |
| JP | 7269000 | 10/1995 |
| JP | 11293350 | 10/1995 |
| JP | 987755 | 3/1997 |

OTHER PUBLICATIONS

*Stahl und Eisen*, vol. 116, No. 6, 1996, pp. 85–87, "Hochtemperatur—Recycling von Verunreinigtem Schrott . . . " K. Scheidig et al.

Yamaguchi et al *Shigen–to–Sozai* vol. 113 No. 12 pp 1110–1113 Dec. 1997.

Raynor et al *Institute of Metals* "Phase Equilibria in Iron Ternary Alloys" No month 1998.

* cited by examiner

*Primary Examiner*—Melvyn Andrews
(74) *Attorney, Agent, or Firm*—Kenyon & Kenyon

(57) ABSTRACT

An iron scrap having a composition comprising iron and iron-soluble elements in the sum of 100 mass %, and containing Cu, elements of the Groups IIIa, VIII, Ib, IIb, IIIb, IVb and Vb having affinity with Cu, and unavoidable impurities, is melted in an oxygen-containing atmosphere. A predetermined amount of C, and whenever necessary, a predetermined amount of at least one of Cr and Mo and/or a predetermined amount of at least one of Mn, V and Ti, are added to the molten steel. The molten iron is then separated into an Fe-enriched layer and a Cu-enriched layer under the molten state. Cu and the above elements having affinity with Cu are separated and precipitated into the Cu-enriched layer by utilizing the difference of the specific gravity between the layers. According to this method, impurity elements detrimental to the stable production of a steel material having a homogeneous property, such as Cu, Sn, etc., can be removed economically and efficiently when the iron scrap is recycled.

18 Claims, 3 Drawing Sheets

METHOD OF MELT-REMOVING IMPURITY ELEMENTS FROM IRON

BACKGROUND OF THE INVENTION

1. Field of the Invention

The present invention relates to a method, for melt-removing impurity elements from iron, capable of economically and efficiently removing impurity elements, that are detrimental to a stable production of steel materials having a homogeneous property, from iron scraps when the iron scraps, from various industrial and public sources, are recycled.

2. Description of the Related Art

When impurity elements called generally "tramp elements", such as Cu and Sn, are contained above predetermined concentrations in steel materials, cracks occur on a slab surface during continuous casting or during hot rolling. Therefore, an extra process step such as surface polishing becomes necessary and invites an increase in the production cost. Moreover, productivity and yield drop, and the mechanical properties of the steel products such as elongation, toughness, deep drawability, and so forth, are remarkably deteriorated, as is well known in the art. These tramp elements are contained in only limited amounts in the molten pig iron produced by a blast furnace using an iron ore as the main raw material, but are contained in large amounts in iron scraps such as the scrap of waste home electric appliances and car scrap. Therefore, when steel products are produced by using economical iron scrap as the main raw material, high grade steels having high mechanical properties cannot be produced easily, and stable production of such steels, with a high yield, cannot be expected, either. For this reason, the development of a stable production method of high quality steel materials using the economical iron scrap has been desired.

Various methods are known for removing the tramp elements such as Cu and Sn from the iron scraps. One of the methods is the one for removing copper from the iron scrap by immersing the iron scrap in aqueous ammonia solution (refer, for example, to Japanese Unexamined Patent Publication (Kokai) No. 6-2053). The second method is the one for extracting and separating Cu, Sn, and the like from the iron scrap by immersing the iron scrap in a molten zinc bath (refer to Japanese Application No. 70269000. The third is the one for pulverizing the iron scrap, and then separating copper from iron (Japanese Patent Unexamined Patent Publication (Kokai) No. 7-253400).

The aqueous ammonia solution immersion method and the molten zinc immersion method can remove Cu exposed on the iron scrap surface. However, they cannot remove Cu contained inside the iron scrap. Moreover, these methods need a specific immersion setup having a large capacity and the processing rate is low because the immersion process is carried out at a low temperature. The pulverized iron scrap separation method needs extra process steps for pulverizing and separating the scrap. Moreover, the processing rate is low and the tramp elements cannot be removed from the steel material.

As described above, these three methods involve the problem in the removing rate of the tramp elements and in the processing rate of the iron scrap, and can never be used as a practical technology.

On the other hand, "Phase Equilibria in Iron Ternary Alloys", The Institute of Metals (1988), pp. 157–167 describes that when at least 0.1% of C is added to a Cu-containing molten iron, the molten iron can be separated into an Fe-enriched layer and a Cu-enriched layer.

It can be anticipated from the observation described in this reference that when the molten iron is cooled down to 1,184° C. and kept under equilibrium after up to 4.5% C is added to the molten iron, the Cu concentration in the molten iron might drop down to 4% (page 160, FIG. 3.65). However, the molten iron can be used as a useful raw material only after Cu concentration in the molten iron is reduced below 3%. Therefore, a practical tramp element removing technology cannot be established by applying the observation of this reference.

The magazine "Shigen-to-Sozai", Vol. 113, No. 12(1997), published by The Mining and Materials Processing Institute of Japan, pp. 1110–1114, and Japanese Unexamined Patent Publication (Kokai) No. 11-293350 describe a method of separating and recovering copper and iron after melting a copper-containing iron scrap in a non-oxidizing atmosphere, and dissolving at least 2% of C in the iron phase.

However, this method is carried out on a laboratory scale and moreover, in a non-oxidizing atmosphere while the formation of slag is prevented. Therefore, a specific melting furnace capable of continuously keeping a non-oxidizing atmosphere must be prepared and in this point, it is not suitable for practical application. Furthermore, even if at least 2% of C is dissolved in the iron phase, the Cu concentration in this phase cannot be lowered to 3% or below and in this point, too, the method is not suitable as a practical technology.

The molten iron formed by melting the iron scraps can become useful as the iron steel raw material only when the Cu concentration in the molten iron is lowered to 3% or below, as described above. However, no reference has ever disclosed a practical technology that can reduce the Cu concentration in the molten iron to 3% or below, to the knowledge of the present inventors.

SUMMARY OF THE INVENTION

To solve the problems of the prior art described above, the present invention is directed to provide a method of melt-removing impurity elements from iron, which method can remove efficiently and economically the impurity elements such as Cu, Sn, etc, under the molten state by melting the iron scrap and then adding C and other suitable alloy elements to the molten iron, and which method can economically offer the iron scraps as a useful iron or steel raw material.

As a result of various studies to solve the problems described above, the present inventors have succeeded in removing the impurity elements such as Cu and Sn by melting the iron scrap and adding C and other suitable alloy elements to the molten iron. The present invention has been thus completed.

The gist of the present invention resides in the following points.

(1) A method of melt-removing impurity elements from iron which comprises the steps of melting an iron scrap having a composition comprising iron and iron-soluble elements in the sum of 100 mass %, and containing Cu and unavoidable impurities, in an oxygen-containing atmosphere; adding C to the molten iron within the range expressed by the formula given below; separating the molten iron into an Fe-enriched layer and a Cu-enriched layer under the molten state; separating Cu contained in the iron scrap and precipitating Cu into the Cu-enriched layer by utilizing the difference of the specific gravity between the layers; and removing Cu from the Fe-enriched layer;

$$5.0\times(1-Cu/100) \leq C \leq 20$$

(with the proviso that the unit of Cu and C is mass %).

(2) A method of melt-removing impurity elements from iron which comprises the steps of melting an iron scrap having a composition comprising iron and iron-soluble elements in the sum of 100 mass %, and containing Cu and unavoidable impurity elements, in an oxygen-containing atmosphere; adding C and at least one of Cr and Mo to the molten iron within the ranges expressed by the formulas given below; separating the molten iron into an Fe-enriched layer and a Cu-enriched layer under the molten state; separating Cu contained in the iron scrap and precipitating Cu into the Cu-enriched layer by utilizing the difference of the specific gravity between the layers; and removing Cu from the Fe-enriched layer;

$$3.3\times(1-Cu/100) \leq C \leq 20,$$

$$4.5\times(1-Cu/100) \leq Cr \leq 30,$$

$$4.5\times(1-Cu/100) \leq Mo \leq 30,$$

(with the proviso that the unit of Cu, C, Cr and Mo is mass %).

(3) A method of melt-removing impurity elements from iron which comprises the steps of melting an iron scrap having a composition comprising iron and iron-soluble elements in the sum of 100 mass %, and containing Cu and unavoidable impurities, in an oxygen-containing atmosphere; adding C and at least one of Mn, V and Ti to the molten iron within the ranges expressed by the formulas given below; separating the molten iron into an Fe-enriched layer and a Cu-enriched layer under the molten state; separating Cu contained in the iron scrap and precipitating Cu into the Cu-enriched layer by utilizing the difference of the specific gravity between the layers; and removing Cu from the Fe-enriched layer;

$$4.3\times(1-Cu/100) \leq C \leq 20,$$

$$4.0\times(1-Cu/100) \leq Mn \leq 30,$$

$$4.0\times(1-Cu/100) \leq Ti \leq 30,$$

$$4.0\times(1-Cu/100) \leq V \leq 30,$$

(with the proviso that the unit of Cu, C, Mn, Ti and V is mass %).

(4) A method of melt-removing impurity elements from iron which comprises the steps of melting an iron scrap having a composition comprising iron and iron-soluble elements in the sum of 100 mass %, and containing Cu and unavoidable impurities, in an oxygen-containing atmosphere; adding C, at least one of Cr and Mo and at least one of Mn, V and Ti to the molten iron within the ranges expressed by the formulas given below; separating the molten iron into an Fe-enriched layer and a Cu-enriched layer under the molten state; separating Cu contained in the iron scrap and precipitating Cu into the Cu-enriched layer by utilizing the difference of the specific gravity between the layers; and removing Cu from the Fe-enriched layer;

$$3.3\times(1-Cu/100) \leq C \leq 20,$$

$$4.5\times(1-Cu/100) \leq Cr \leq 30,$$

$$4.5\times(1-Cu/100) \leq Mo \leq 30,$$

$$4.3\times(1-Cu/100) \leq C \leq 20,$$

$$4.0\times(1-Cu/100) \leq Mn \leq 30,$$

$$4.0\times(1-Cu/100) \leq Ti \leq 30,$$

$$4.0\times(1-Cu/100) \leq V \leq 30,$$

(with the proviso that the unit of Cu, C, Cr, Mo, Mn, Ti and V is mass %).

(5) A method of melt-removing impurity elements from iron which comprises the steps of melting an iron scrap having a composition comprising iron and iron-soluble elements in the sum of 100 mass %, containing Cu, elements of the Groups IIIa, VIII, Ib, IIb, IIIb, IVb and Vb having affinity with Cu, and unavoidable impurities, in an oxygen-containing atmosphere; adding C to the molten iron within the range expressed by the formula given below; separating the molten iron into an Fe-enriched layer and a Cu-enriched layer under the molten state; separating Cu and the elements of the Groups IIIa, VIII, Ib, IIb, IIIb, IVb and Vb having affinity with Cu, contained in the iron scrap, and precipitating Cu and the elements of the Groups IIIa, VIII, Ib, IIb, IIIb, IVb and Vb having affinity with Cu into the Cu-enriched layer by utilizing the difference of the specific gravity between the layers; and removing Cu and the elements of the Groups IIIa, VIII, Ib, IIb, IIIb, IVb and Vb having affinity with Cu from the Fe-enriched layer;

$$5.0\times(1-Cu/100) \leq C \leq 20$$

(with the proviso that the unit of Cu and C is mass %).

(6) A method of melt-removing of impurity elements from iron which comprises the steps of melting an iron scrap having a composition comprising iron and iron-soluble elements in the sum of 100 mass %, and containing Cu, elements of the Groups IIIa, VIII, Ib, IIb, IIIb, IVb and Vb having affinity with Cu, and unavoidable impurities, in an oxygen-containing atmosphere; adding C and at least one of Cr and Mo to the molten iron within the ranges expressed by the formulas given below; separating the molten iron into an Fe-enriched layer and a Cu-enriched layer under the molten state; separating Cu and the elements of the Groups IIIa, VIII, Ib, IIb, IIIb, IVb and Vb having affinity with Cu, contained in the iron scrap, and precipitating Cu and the elements of the Groups IIIa, VIII, Ib, IIb, IIIb, IVb and Vb having affinity with Cu into the Cu-enriched layer by utilizing the difference of the specific gravity between the layers; and removing Cu and the elements of the Groups IIIa, VIII, Ib, IIb, IIIb, IVb and Vb having affinity with Cu from the Fe-enriched layer;

$$3.3\times(1-Cu/100) \leq C \leq 20,$$

$$4.5\times(1-Cu/100) \leq Cr \leq 30,$$

$$4.5\times(1-Cu/100) \leq Mo \leq 30,$$

(with the proviso that the unit of Cu, C, Cr and Mo is mass %).

(7) A melt-removing method of impurity elements from iron which comprises the steps of melting an iron scrap having a composition comprising iron and iron-soluble elements in the sum of 100 mass %, and containing Cu, elements of the Groups IIIa, VIII, Ib, IIb, IIIb, IVb and Vb and having affinity with Cu, and unavoidable impurities, in an oxygen-containing atmosphere; adding C and at least one of Mn, V and Ti to the molten iron within the ranges expressed by the formulas given below; separating the molten iron into an Fe-enriched layer and a Cu-enriched layer under the molten state; separating Cu and the elements of the Groups IIIa, VIII, Ib, IIb, IIIb, IVb and Vb having affinity with Cu, contained in the iron scrap, and precipitating Cu and the elements of the Groups IIIa, VIII, Ib, IIb, IIIb, IVb and Vb having affinity with Cu into the Cu-enriched layer by utilizing the difference of the specific gravity between the layers; and removing Cu and the elements of the Groups IIIa, VIII, Ib, IIb, IIIb, IVb and Vb having affinity with Cu from the Fe-enriched layer;

$$4.3\times(1-Cu/100) \leq C \leq 20,$$

$$4.0\times(1-Cu/100) \leq Mn \leq 30,$$

$$4.0\times(1-Cu/100) \leq Ti \leq 30,$$

$$4.0\times(1-Cu/100) \leq V \leq 30,$$

(with the proviso that the unit of Cu, C, Mn, Ti and V is mass %).

(8) A method of melt-removing impurity elements from iron which comprises the steps of melting an iron scrap having a composition comprising iron and iron-soluble elements in the sum of 100 mass %, and containing Cu, elements of the Groups IIIa, VIII, Ib, IIb, IIIb, IVB and Vb having affinity with Cu, and unavoidable impurities, in an oxygen-containing atmosphere; adding C, at least one of Cr and Mo and at least one of Mn, V and Ti to the molten iron within the ranges expressed by the formulas given below; separating the molten iron into an Fe-enriched layer and a Cu-enriched layer under the molten state; separating Cu and the elements of the Groups IIIa, VIII, Ib, IIb, IIIb, IVb and Vb having affinity with Cu, contained in the scrap iron, and precipitating Cu and the elements of the Groups IIIa, VIII, Ib, IIb, IIIb, IVb and Vb having affinity with Cu into the Cu-enriched layer by utilizing the difference of the specific gravity between the layers; and removing Cu and the elements of the Groups IIIa, VIII, Ib, IIb, IIIb, IVb and Vb having affinity with Cu from the Fe-enriched layer;

$$3.3\times(1-Cu/100) \leq C \leq 20,$$

$$4.5\times(1-Cu/100) \leq Cr \leq 30,$$

$$4.5\times(1-Cu/100) \leq Mo \leq 30,$$

$$4.3\times(1-Cu/100) \leq C \leq 20,$$

$$4.0\times(1-Cu/100) \leq Mn \leq 30,$$

$$4.0\times(1-Cu/100) \leq Ti \leq 30,$$

$$4.0\times(1-Cu/100) \leq V \leq 30,$$

(with the proviso that the unit of Cu, C, Cr, Mo, Mn, Ti and V is mass %).

(9) A method of melt-removing impurity elements from iron, according to any of (1) to (8), wherein 0.1 to 30 mass % of Ag on the basis of the total mass of the molten iron is further added to, or is brought into contact with, the molten iron.

(10) A method of melt-removing impurity elements from iron, according to any of (1) to (8), wherein, after the molten iron is separated into the Fe-enriched layer and the Cu-enriched layer under the molten state, only the Fe-enriched layer is transferred to another vessel or the Cu-enriched layer is discharged outside a vessel and then, 0.1 to 30 mass % of Ag on the basis of the total mass of the molten iron is further added to, or is brought into contact with, the molten iron.

(11) A method of melt-removing impurity elements from iron, according to any of (1) to (8), wherein oxygen is added into the molten iron, and Al is oxidized and removed to a range of not greater than 1 mass %.

(12) A method of melt-removing impurity elements from iron, according to any of (1) to (8), wherein 0.1 to 30 mass % of Ag on the basis of the total mass of the molten iron is further added to, or is brought into contact with, the molten iron, oxygen is added into the molten iron, and Al is oxidized and removed to a range of not grater than 1 mass %.

(13) A method of melt-removing impurity elements from iron, according to any of (1) to (8), wherein, after the molten iron is separated into the Fe-enriched layer and the Cu-enriched layer under the molten state, only the Fe-enriched layer is transferred to another vessel or the Cu-enriched layer is discharged outside a vessel, 0.1 to 3 mass % of Ag on the basis of the total mass of the molten iron is further added to, or is brought into contact with, the molten iron, oxygen is added to the molten iron, and Al is oxidized and removed to a range of not greater than 1 mass %.

(14) A method of melt-removing impurity elements from iron, according to any of (1) to (8), wherein the molten iron is stirred.

(15) A method of melt-removing impurity elements from iron, according to any of (1) to (8), wherein the iron scrap is melted in an electric furnace, and then Cu and the elements of the Groups IIIa, VIII, Ib, IIb, IIIb, IVb and Vb having affinity with Cu are melt-removed inside the electric furnace.

(16) A method of melt-removing impurity elements from iron, according to any of (1) to (8), wherein the iron scrap is melted in a cupola furnace.

DESCRIPTION OF THE PREFERRED EMBODIMENTS

Figure 1:
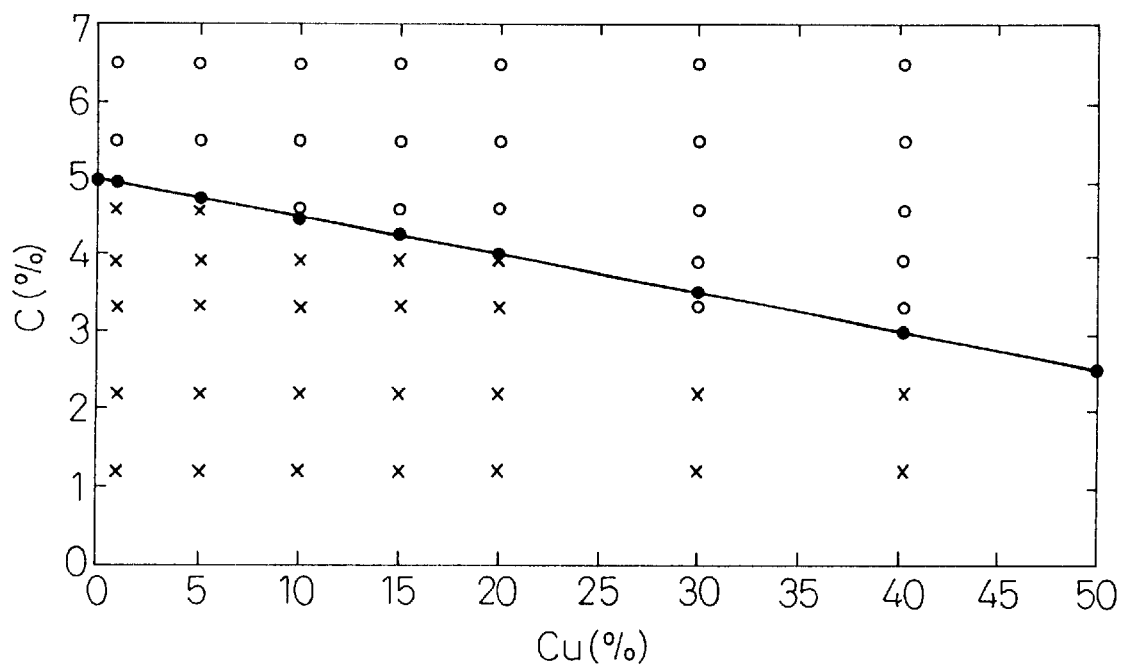
FIG. 1 is a graph showing the relationship between a C concentration that are added and a Cu concentration.

The inventors of the present invention have conducted various studies on the methods of melting various iron scraps from various industrial and public sources, and separating them into an Fe-enriched layer having a high Fe concentration and a Cu-enriched layer having a high Cu concentration under the molten state. As a result, the present inventors have acquired a novel observation and have completed the present invention on the basis of this observation.

When an iron scrap containing Cu, etc., is melted once, Cu and those impurity elements which have affinity with Cu(such as Sn) cannot be removed by oxidization by an oxygen blowing method because they have low affinity with oxygen, unlike Si and Al. Since they do not react with a so-called "steel-making molten slag", they cannot be refined by slag refining, either. For these reasons, no method has been developed so far that can remove effectively and economically Cu and the impurity elements having affinity with Cu, such as Sn, from the molten iron. After intensive studies, however, the present inventors have discovered that when C (carbon) is added in a predetermined concentration to the molten iron scrap to separate the iron scrap into an Fe-enriched layer and a Cu-enriched layer under the molten state, Cu and the elements of the Groups IIIa, VIII, Ib, IIb, IIIb, IVb and Vb (such as Sn), that have affinity with Cu, can be concentrated and precipitated in the Cu-enriched layer. The present invention has thus been completed on the basis of this observation.

Next, the principle of the present invention will be explained. A force of attraction works between the C atoms and Fe atoms, but a force of repulsion works between the C atoms and the Cu atoms. As a result, the molten iron separates into the Fe-enriched layer and the Cu-enriched layer under the molten state. C is further added in excess under this separation state to form a carbide, that substantially does not contain at all Cu, so that Cu in the Fe-enriched layer is further discharged into the Cu-enriched layer due to the difference of the specific gravity, and is concentrated and separated. The carbide is selected as the product for the following reasons. C is molten preferentially in Fe, and the degree of its melting in Cu is low. Second, the specific gravity of the carbide is almost equal to that of the molten iron. Therefore, the carbide mixes with the Fe-enriched layer and does not hinder precipitation of the Cu-enriched layer that has a greater specific gravity.

The present inventors have also found that, when those elements which promote the formation of the carbide, such as Cr, Mn, Mo, Ti, V, and so forth, are added within suitable concentration ranges besides C so as to promote the formation of the carbide in the Fe-enriched layer, the concentrations of Cu and the elements of the Groups IIIa, VIII, Ib, IIb, IIIb, IVb and Vb, that have high affinity with Cu, can be remarkably lowered. The present inventors have further acquired the following observation. When silver (Ag), that hardly dissolves Fe under the molten state and absorbs only Cu and the elements having affinity with Cu described above, is added within a predetermined concentration range to the molten iron, or is brought into contact with the molten iron, the effect of removing the impurity elements can be improved remarkably. It has also been found that aluminum (Al) that hinders the separation of the Fe-enriched layer and the Cu-enriched layer is preferably removed by oxidization refining, and is utilized as a heat source. The present inventors have further found that the time required for the separation can be shortened when the scrap iron is stirred under the molten state.

The practical technology that can reduce the Cu concentration in the molten iron to 3% or below has never been described in any references to the knowledge of the present inventors, as described already. Therefore, the present invention, that can reduce the Cu concentration to 3% or below, has extremely great technical significance as a technology that would make great contributions to industry and society for solving the environmental problems invited by the waste of home electric appliances and automobiles and for enhancing recycling of the waste as a re-usable resource.

The constituent requirements of the present invention will be now explained. First, the reasons for limitation of the melting condition, that is one of the constituent requirements of the present invention, will be explained.

Melting and atmosphere:

In the present invention, the iron scrap is melted in the atmosphere where oxygen exists. If oxygen exists in the melting atmosphere, slag may be formed during the melting process, or the molten iron may be oxidized. However, since the present invention is directed to economically provide iron scrap as a useful iron or steel raw material and to melt large quantities of the iron scrap, the loss resulting from oxidization is extremely limited even when the surface of the molten iron is oxidized. The formation of the slag is rather preferred from the aspects of the surface protection of the molten iron, retention of the temperature, and the component adjustment in subsequent process steps.

In these points, the present invention is different fundamentally from the separation/recovery method of copper and iron that is described in Japanese Unexamined Patent Publication (Kokai) No. 11-293350.

The melting method and the oxygen concentration in the atmosphere are not particularly limited. Melting is generally carried out in the open air atmosphere but the mode of melting, inclusive of the atmosphere, somewhat changes depending on the kind of the furnace used for melting.

In the present invention, melting is carried out preferably in an electric furnace or a cupola furnace. Therefore, the melting operation in these two furnaces will be explained.

Melting by electric furnace and atmosphere:

① When heating/melting is made by arc melting alone:

When a D.C. arc furnace having an electrode at the furnace bottom is used, the iron scrap is charged into the furnace. A voltage is applied between the carbon electrode and the scrap to conduct arc melting. Once the scrap is melted, the slag is charged so that the electrode can be immersed in the slag.

The molten iron is covered completely with the slag and is cut off from the atmosphere. Therefore, the atmosphere inside the furnace may be sufficiently the air atmosphere and need not at all be converted to an oxygen-free atmosphere.

② When heating/melting is made using "carbon material injection+oxygen gas burner" or "heavy oil combustion burner" in combination:

In this case, the melting rate is positively elevated by using a burner, that blows the oxygen gas and the carbon material or the heavy oil, to utilize the combustion heat. In this case, too, the molten iron is covered with the slag after it is melted, in the same way as in arc melting. Therefore, the atmosphere need not be converted to the oxygen-free atmosphere. Incidentally, it is possible to oxidize and remove the impurity P in the molten iron as phosphoric acid by raising the degree of oxidization of the slag.

In the case of this heat/melting, power consumption (electric power original unit) can be decreased. In consequence, the melting cost can be lowered.

Cupola melting and atmosphere:

In this case, the iron scrap and the carbonaceous material are charged from the furnace top, and air or oxygen gas is blown from the lower side of the furnace. Large quantities of CO are formed at the lower inside of the furnace due to the reaction $C+\frac{1}{2}O_2=CO$, and the atmosphere changes to the so-called "reducing atmosphere". Because the amount of $CO_2$ is great at the furnace top due to the reaction $CO+\frac{1}{2}O_2=CO_2$, the atmosphere is the oxidizing atmosphere. Therefore, both reducing and oxidizing atmospheres co-exist inside one furnace.

Incidentally, when the carbonaceous material is used as the fuel source, carburizing occurs due to the CO gas or $CO_2$ gas and the melting point of iron drops from 1,536° C. to 1,150° C. Therefore, the iron scrap can be melted efficiently.

As described above, the oxygen-containing atmosphere can be the reducing atmosphere and the oxidizing atmosphere in the practical melting operation, and either of them can be used in the present invention.

Next, the reasons for limitation of the condition of the additives such as C as another constituent requirement of the present invention will be explained.

C (carbon):

Carbon (C) increases the force of repulsion between the Fe atoms and the Cu atoms in the molten iron. It is also an important element that positively forms carbide and separates the Fe-enriched layer and the Cu-enriched layer. The lower limit of the C concentration is the one that makes the Cu concentration in at least the Fe-enriched layer to 3% or below, as expressed by the formula given below. In other words, the lower limit is the one that can sufficiently form the carbide in the Fe-enriched layer under the molten state. It is also the function of the Cu concentration in the molten iron. The upper limit is set to 20% in view of the melting cost.

$$5.0 \times (1-Cu/100) \leq C \leq 20$$

(with the proviso that the unit of Cu and C is mass %).

Here, the present inventors have conducted various experiments and analyzed the experimental results. As a result, the present inventors have found that when the Cu concentration increases, the lower limit of the C concentration, at which the carbide is formed, drops, as shown in FIG. 1, in the molten iron having a composition comprising iron and elements soluble in iron in the sum of 100 mass % and containing Cu and unavoidable impurity elements. The lower limit value of the C concentration is based on this finding.

In the experiments shown in FIG. 1, 100 kg of molten pure iron is prepared in an electric furnace, and pure copper is added within the range of 1 to 40%. Furthermore, carbon is added within the range of 1 to 7%. The molten iron is kept under the molten state for 20 minutes and is then cooled gradually to give an ingot. The Fe-enriched layer is cut out from the upper part of the resulting ingot, and the Cu concentration is analyzed. FIG. 1 shows this result. In the graph, white circle ○ represents the case where the Cu concentration in the Fe-enriched layer is not greater than 3%, and X represents the case where the Cu concentration is greater than 3%.

Retention temperature:

The retention temperature is not particularly limited because the molten steel can be separated vertically into the Fe-enriched layer and the Cu-enriched layer under the molten state. However, solubility of Cu in the Fe-enriched layer decreases with a lower temperature and discharge of Cu is promoted. If the temperature is excessively lower, however, the molten steel enters a semi-solidified state and its fluidity is inhibited. If the temperature is excessively higher, the formation of the carbide is inhibited. Therefore, the temperature is preferably retained at 1,100 to 1,400° C.

Cr and Mo:

These elements have the effect of decreasing Cu solubility in the Fe-enriched layer and the effect of promoting the formation of the carbide. When these elements are added, the Cu removal effect can be increased remarkably. The lower limit of the addition concentration of these addition elements is set to the minimum concentration, i.e. $4.5 \times (1-Cu/100)$, that provides the Cu solubility decreasing effect and the carbide formation effect, and the upper limit is set to 30% in consideration of the melting cost.

Figure 2A:
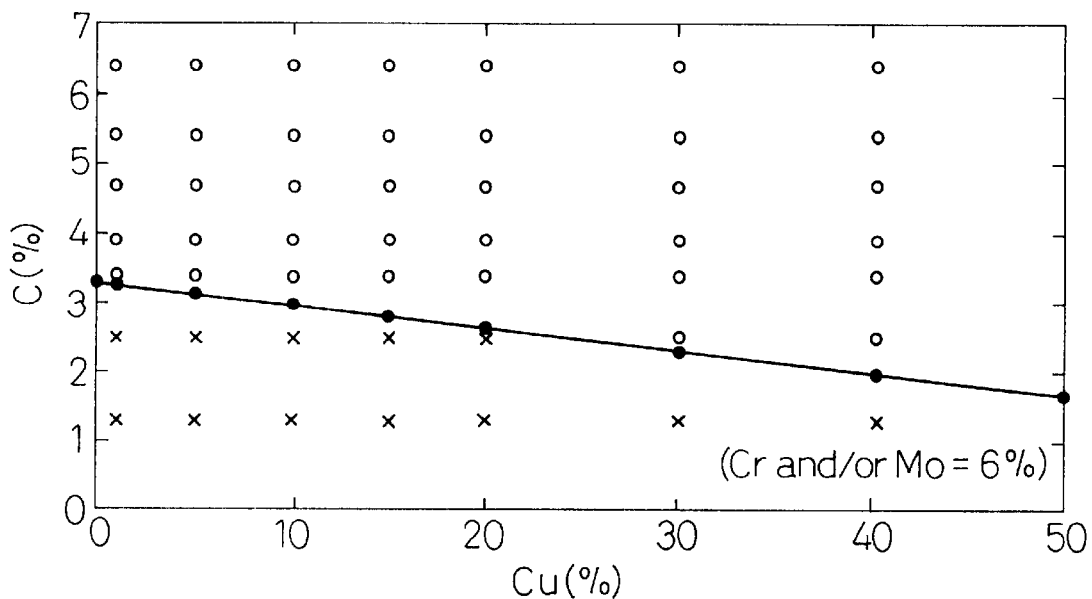
FIG. 2(A) is a graph showing the relationship between a c concentration that are added and a Cu concentration.
Figure 2B:
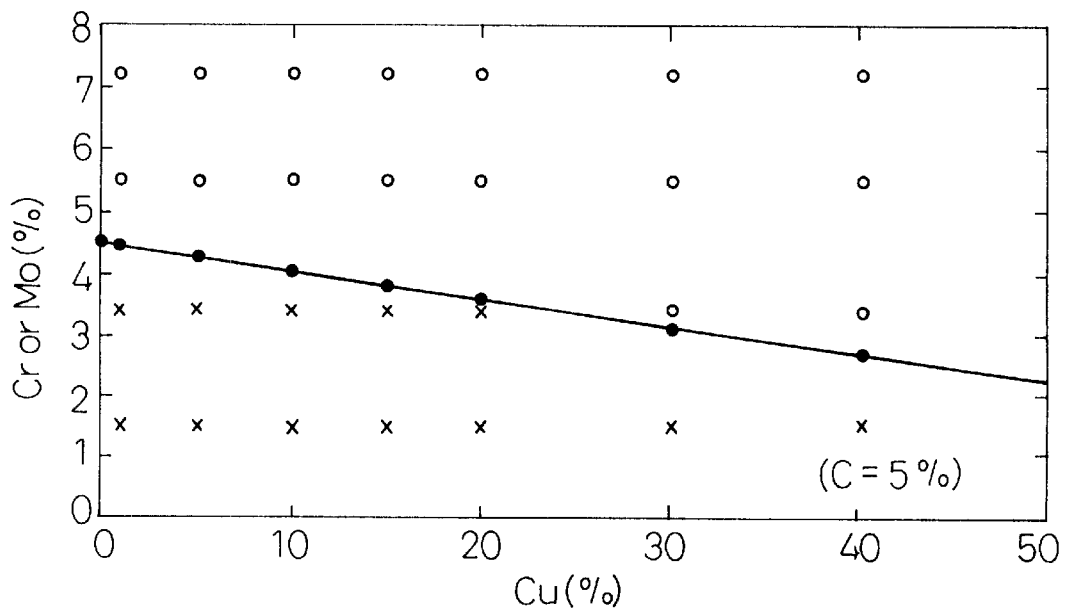
FIG. 2(B) is a graph showing the relationship between a Cr or Mo concentration that are added and a Cu concentration.

The lower limit values of the Cr, Mo and C concentrations are based on the finding that when the Cu concentration increases, the lower limit concentrations of Cr, Mo and C, at which the carbide is formed, drop, as shown in FIGS. 2(A) and 2(B). This finding is obtained as a result of analyses of the results of various experiments conducted by the present inventors.

Incidentally, FIGS. 2(A) and 2(B) show the result of analyses of the Cu concentration obtained in the following way. 100 kg of molten pure iron is prepared in an electric furnace, and pure copper is added within the range of 1 to 40%. Carbon is further added within the range of 1 to 7%, and Cr or Mo is added within the range of 1 to 8%. After the molten steel is retained for 20 minutes under the molten state, it is cooled gradually to give an ingot. The Fe-enriched layer is cut out from the upper part of the resulting ingot, and the Cu concentration is analyzed. FIG. 2(A) shows the result when the Mo concentration is 6%. FIG. 2(B) shows the result when the C concentration is 5%. In these drawings, a white circle ○ represents the case where the Cu concentration in the Fe-enriched layer is not greater than 3%, and X represents the case where it is greater than 3%.

$$4.5 \times (1-Cu/100) \leq Cr, Mo \leq 30$$

(with the proviso that the unit of Cu, Cr and Mo are mass %).

$$3.3 \times (1-Cu/100) \leq C \leq 20$$

(with the proviso that the unit of Cu and C is mass %).

Mn, V and Ti:

These elements have the effect of promoting the formation of the carbide in the Fe-enriched layer. When these elements are added, the Cu removing effect increases remarkably. The lower limit of the addition concentration of these elements is set to the minimum concentration that provides the carbide formation effect, that is, $4.0 \times (1 \times Cu/100)$, and the upper limit is set to 30% in view of the melting cost.

Incidentally, the lower limit values of the Mn, V, Ti and C concentrations are based on the following fact, that is found out by the present inventors as a result of analyses of various experimental results. In other words, the lower limit of the Mn, V, Ti and C concentrations for forming the carbide decreases when the Cu concentration increases, as shown in FIGS. 3(A) and 3(B).

Figure 3A:
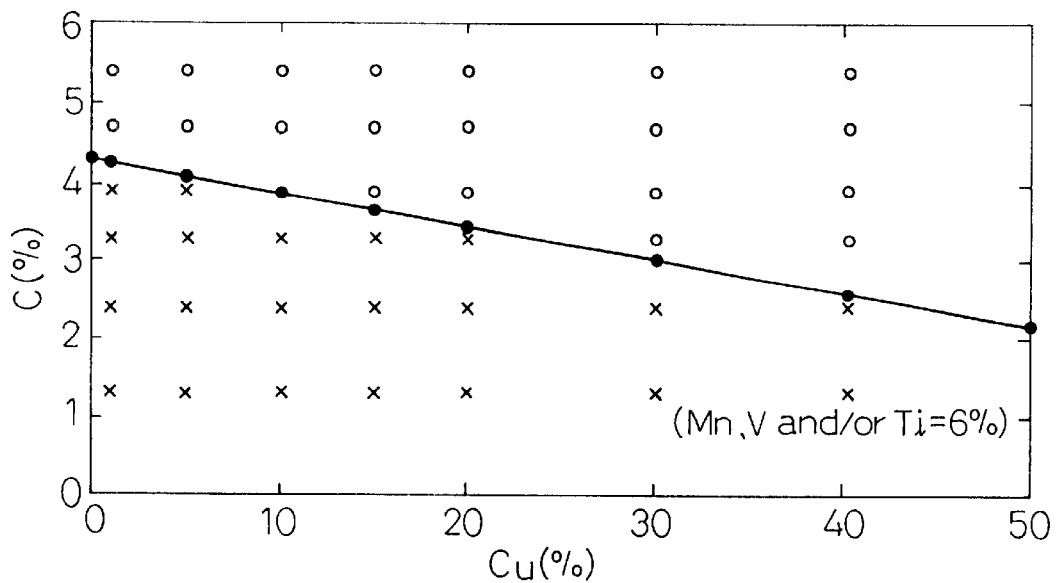
FIG. 3(A) is a graph showing the relationship between a C concentration that are added and a Cu concentration.
Figure 3B:
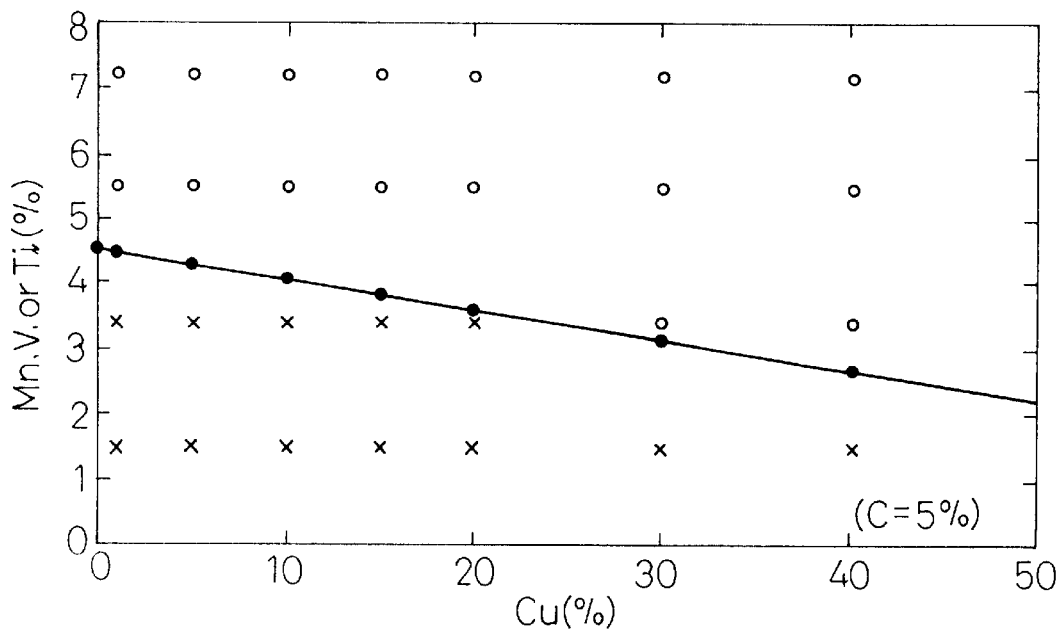
FIG. 3(B) is a graph showing the relationship between a Mn, V or Ti concentration that are added and a Cu concentration.

The results of the analyses shown in FIGS. 3(A) and 3(B) are acquired in the following way. First, 100 kg of molten pure iron is prepared in an electric furnace. Pure copper is added within the range of 1 to 40% and carbon is added within the range of 1 to 7%. Furthermore, Mn, V and/or Ti are added within the range of 1 to 8%. The molten iron is kept under the molten state for 20 minutes, and is then cooled gradually to give an ingot. A Fe-enriched layer is cut out from the upper part of the resulting ingot, and the Cu concentration is analyzed. FIG. 3(A) shows the result when the Mn, V and/or Ti concentrations are 6%, and FIG. 3(B) shows the result when the concentrations are 5%. In these drawings, a white circle ○ represents the case where the Cu concentration in the Fe-enriched layer is not greater than 3%, and x represents the case where it is grater than 3%.

$$4.0 \times (1-Cu/100) \leq C \leq 20$$

(with the proviso that the unit of Cu and C is mass %)

Ag:

When Ag is added to the Fe-enriched layer formed by adding C, Cr, etc., described above, molten Ag selectively absorbs only Cu and elements having affinity with Cu in the Fe-enriched layer. In this way, Ag exhibits its function of separating Cu and the elements having affinity with Cu. In other words, Ag has the specific property such that it does not have solubility in molten iron but dissolves almost 100% in molten copper, and has a specific gravity greater than that of iron. The present invention separates Cu and the elements having affinity with Cu by utilizing this property. Since Ag has a greater specific gravity than Cu, Ag collects the floating Cu droplets in the Fe-enriched layer and precipitates them into the Cu-enriched layer. The lower limit of the Ag addition concentration is set to 0.1% that is the minimum concentration at which the Cu removing effect can be obtained, and its upper limit is set to 20% in consideration of the melting cost.

To lower easily the Cu concentration in the Fe-enriched layer to 1% or below, it is effective to once transfer the Fe-enriched layer into another vessel or to discharge the precipitated Cu-enriched layer, thereby leaving only the Fe-enriched layer in the vessel before the addition of Ag, and then to add Ag. Because Ag used in this way can be separated and used again by separating the impurity elements dissolved in Ag, such as Cu, by a known method (for example, wet electrolytic refining), this method is advantageous from the aspect of the production cost.

Al:

If Al is dissolved in large quantities in the molten iron, it becomes the factor that impedes the separation of the Fe-enriched layer and the Cu-enriched layer. Therefore, Al is preferably removed after oxidization by oxygen. If the Al concentration is below 1%, the effect of Al on the separation can be almost neglected. The allowable upper limit of the Al concentration is therefore set to 1%. When the refining cost for removing Al is taken into consideration, the lower limit concentration is preferably 0.0001%. Incidentally, the oxidization combustion heat of Al can, of course, be utilized effectively as the melting heat source of the iron scrap.

Stirring:

Stirring of the molten iron is effective for precipitating efficiently the fine molten Cu droplets, that are suspended in the Fe-enriched layer, into the Cu-enriched layer. The stirring method is not particularly limited. For example, mechanical stirring using an impeller, gas stirring, electromagnetic stirring, etc. can be employed.

As described above, the present invention melts first the iron scrap and then adds C and other suitable alloy elements. In consequence, the present invention can efficiently and economically remove the impurity elements such as Cu, Sn, etc., under the molten state.

Therefore, the present invention makes great contributions to the development of the industry as a melt-removing method, for the impurity elements in iron, that completely solves the problems of the prior art.

EXAMPLE 1

Iron scrap having the compositions shown in Table 1 (No. 1: scrap of waste home electric appliances, No. 2: scrap of scrap cars) were melted in an electric furnace at about 1,600° C., and C was then added. After at least one of Cr, Mn, Mo, V and Ti was added, the molten scrap was held at a temperature within the range of 1,100 to 1,400° C. for 30 minutes. After each molten scrap was cooled, the resulting ingot was cut longitudinally. The existence of the separation of the Fe-enriched layer at the upper part of the ingot and the Cu-enriched layer at the lower part was observed. The element concentrations in the Fe-enriched layer were analyzed. The result was tabulated in Table 2. As tabulated in Table 2, iron having utility as an iron steel material could be recovered when the Cu concentration in the Fe-enriched layer was 3% or below.

Incidentally, the judgement standard in Table 2 is listed in (1), (2) and (3).

(1) To judge the Fe/Cu separation, the ingot obtained by cooling the molten scrap was cut longitudinally. The cut surface was inspected by eye. When the upper part had the iron color, the separation was judged as "YES" and when no color difference was observed between the upper and lower parts, the separation was judged as "NO".

(2) Cu removing ratio (%)=(Cu % in scrap−Fe % in scrap)/100

(3) Overall evaluation judgement standard:

When the Fe/Cu separation was "YES", when the Cu % in the Fe-enriched layer was 3% or below and moreover, when the concentration of the elements having affinity with Cu (such as Sn, Pb, Zn) decreased, the overall evaluation was ○, and all other cases were X.

Comparative Examples represent the cases where the C addition amount did not satisfy the conditional formula. Some of them failed to satisfy because the Fe/Cu separation could not be observed, or even when it was observed, the Cu concentration in the Fe-enriched layer was higher than 3%.

TABLE 1

| Scrap No. | C | Si | Mn | P | S | Cu | Sn | Pb | Zn | Cr | Ni | Mo |
|---|---|---|---|---|---|---|---|---|---|---|---|---|
| 1 | 0.09 | 0.03 | 0.1 | 0.04 | 0.04 | 12.3 | 0.05 | 0.03 | 0.25 | 0.07 | 0.13 | 0.01 |
| 2 | 0.33 | 0.08 | 0.36 | 0.026 | 0.04 | 41 | 0.15 | 0.13 | 0.35 | 0.28 | 0.07 | 0.02 |

(mass %)

TABLE 2

| | Scrap No. | Addition element increment (%) | | | | | | Retention temp. ° C. | Element concentration at ingot upper part (%) | | | | | | | Fe/Cu separation | Cu-removing ratio (%) | Overall evaluation |
|---|---|---|---|---|---|---|---|---|---|---|---|---|---|---|---|---|---|---|
| | | C | Cr | Mo | Mn | V | Ti | | Cu | Sn | Pb | Zn | Cr | Ni | Mo | Fe | | | |
| Example | | | | | | | | | | | | | | | | | | | |
| 1 | 1 | 5 | — | — | — | — | — | 1254 | 2.8 | 0.004 | 0 | 0.13 | 0.08 | 0.14 | 0.01 | 96.8 | YES | 77 | ○ |
| 2 | 2 | 3 | — | — | — | — | — | 1301 | 2.7 | 0.003 | 0 | 0.07 | 0.45 | 0.10 | 0.03 | 96.6 | YES | 93 | ○ |
| 3 | 2 | 5 | — | — | — | — | — | 1275 | 2.2 | 0.003 | 0 | 0.07 | 0.45 | 0.10 | 0.03 | 97.1 | YES | 95 | ○ |
| 4 | 1 | 5 | 1 | — | — | — | — | 1312 | 2.7 | 0.004 | 0 | 0.13 | 0.08 | 0.14 | 0.01 | 96.9 | YES | 78 | ○ |
| 5 | 1 | 5 | 5 | — | — | — | — | 1329 | 2.2 | 0.003 | 0 | 0.12 | 0.13 | 0.14 | 0.01 | 97.4 | YES | 82 | ○ |
| 6 | 1 | 5 | 7 | — | — | — | — | 1251 | 1.9 | 0.003 | 0 | 0.12 | 0.08 | 0.14 | 0.01 | 97.7 | YES | 85 | ○ |
| 7 | 1 | 10 | 10 | — | — | — | — | 1313 | 1.3 | 0.003 | 0 | 0.12 | 0.09 | 0.15 | 0.01 | 98.3 | YES | 89 | ○ |
| 8 | 1 | 15 | 15 | — | — | — | — | 1239 | 1.1 | 0.003 | 0 | 0.12 | 0.10 | 0.15 | 0.01 | 98.5 | YES | 91 | ○ |

TABLE 2-continued

| Scrap No. | Addition element increment (%) | | | | | | Retention temp. °C. | Element concentration at ingot upper part (%) | | | | | | | | Fe/Cu sepa- ration | Cu- removing ratio (%) | Overall evalua- tion |
|---|---|---|---|---|---|---|---|---|---|---|---|---|---|---|---|---|---|---|
| | C | Cr | Mo | Mn | V | Ti | | Cu | Sn | Pb | Zn | Cr | Ni | Mo | Fe | | | |
| 9 | 2 | 5 | 1 | — | — | — | — | 1257 | 2.0 | 0.003 | 0 | 0.07 | 0.46 | 0.10 | 0.03 | 97.3 | YES | 95 | ○ |
| 10 | 2 | 5 | 5 | — | — | — | — | 1230 | 1.8 | 0.003 | 0 | 0.07 | 0.46 | 0.10 | 0.03 | 97.5 | YES | 96 | ○ |
| 11 | 2 | 5 | 7 | — | — | — | — | 1311 | 1.6 | 0.003 | 0 | 0.07 | 0.46 | 0.10 | 0.03 | 97.7 | YES | 96 | ○ |
| 12 | 2 | 10 | 10 | — | — | — | — | 1174 | 1.2 | 0.003 | 0 | 0.07 | 0.46 | 0.10 | 0.03 | 98.1 | YES | 97 | ○ |
| 13 | 2 | 15 | 15 | — | — | — | — | 1227 | 1.1 | 0.003 | 0 | 0.07 | 0.46 | 0.10 | 0.03 | 98.2 | YES | 97 | ○ |
| 14 | 1 | 5 | — | 1 | — | — | — | 1207 | 2.8 | 0.004 | 0 | 0.13 | 0.09 | 0.15 | 0.01 | 96.8 | YES | 77 | ○ |
| 15 | 1 | 5 | — | 5 | — | — | — | 1232 | 2.2 | 0.003 | 0 | 0.12 | 0.09 | 0.15 | 0.01 | 97.4 | YES | 82 | ○ |
| 16 | 1 | 5 | — | 7 | — | — | — | 1329 | 1.7 | 0.003 | 0 | 0.12 | 0.09 | 0.15 | 0.01 | 97.9 | YES | 86 | ○ |
| 17 | 1 | 5 | — | — | 1 | — | — | 1225 | 2.8 | 0.004 | 0 | 0.13 | 0.08 | 0.14 | 0.01 | 96.8 | YES | 77 | ○ |
| 18 | 1 | 5 | — | — | 5 | — | — | 1159 | 2.1 | 0.003 | 0 | 0.12 | 0.08 | 0.14 | 0.01 | 97.5 | YES | 83 | ○ |
| 19 | 1 | 5 | — | — | 7 | — | — | 1257 | 1.8 | 0.003 | 0 | 0.12 | 0.08 | 0.14 | 0.01 | 97.8 | YES | 85 | ○ |
| 20 | 2 | 5 | — | — | 5 | — | — | 1321 | 1.9 | 0.003 | 0 | 0.07 | 0.46 | 0.10 | 0.03 | 97.4 | YES | 95 | ○ |
| 21 | 1 | 5 | — | — | — | 1 | — | 1322 | 2.8 | 0.004 | 0 | 0.13 | 0.09 | 0.15 | 0.01 | 96.8 | YES | 77 | ○ |
| 22 | 1 | 5 | — | — | — | 5 | — | 1335 | 2.1 | 0.003 | 0 | 0.12 | 0.09 | 0.15 | 0.01 | 97.5 | YES | 83 | ○ |
| 23 | 1 | 5 | — | — | — | 7 | — | 1284 | 1.5 | 0.003 | 0 | 0.12 | 0.09 | 0.15 | 0.01 | 98.1 | YES | 88 | ○ |
| 24 | 1 | 5 | — | — | — | — | 1 | 1166 | 2.7 | 0.004 | 0 | 0.13 | 0.09 | 0.15 | 0.01 | 96.9 | YES | 78 | ○ |
| 25 | 1 | 5 | — | — | — | — | 5 | 1251 | 1.9 | 0.003 | 0 | 0.12 | 0.09 | 0.15 | 0.01 | 97.7 | YES | 85 | ○ |
| 26 | 1 | 5 | — | — | — | — | 7 | 1294 | 1.4 | 0.003 | 0 | 0.12 | 0.09 | 0.15 | 0.01 | 98.2 | YES | 89 | ○ |
| 27 | 1 | 10 | 5 | — | 5 | — | — | 1183 | 1.5 | 0.003 | 0 | 0.12 | 0.09 | 0.15 | 0.01 | 98.1 | YES | 88 | ○ |
| 28 | 2 | 5 | 5 | — | 1 | — | — | 1303 | 1.7 | 0.003 | 0 | 0.07 | 0.46 | 0.10 | 0.03 | 97.6 | YES | 96 | ○ |
| 29 | 1 | 10 | 1 | 2 | 1 | 3 | 3 | 1262 | 1.2 | 0.003 | 0 | 0.12 | 0.10 | 0.16 | 0.01 | 98.4 | YES | 90 | ○ |
| 30 | 2 | 10 | 1 | 2 | 1 | 3 | 3 | 1332 | 1.4 | 0.003 | 0 | 0.07 | 0.46 | 0.10 | 0.03 | 97.9 | YES | 97 | ○ |
| 31 | 2 | 15 | 2 | 2 | 2 | 2 | 2 | 1193 | 1.4 | 0.003 | 0 | 0.07 | 0.46 | 0.10 | 0.03 | 97.9 | YES | 97 | ○ |
| Comp. Example | | | | | | | | | | | | | | | | | | | |
| 1 | 1 | 0.3 | — | — | — | — | — | 1244 | 12.3 | 0.050 | 0.03 | 0.25 | 0.07 | 0.13 | 0.01 | 87.2 | NO | 0 | x |
| 2 | 1 | 2 | — | — | — | — | — | 1331 | 8.1 | 0.008 | 0 | 0.18 | 0.07 | 0.13 | 0.01 | 91.5 | YES | 34 | x |
| 3 | 2 | 1 | — | — | — | — | — | 1205 | 41.0 | 0.150 | 0.13 | 0.35 | 0.28 | 0.07 | 0.02 | 58.1 | NO | 0 | x |

EXAMPLE 2

After the iron scrap No. 1 shown in Table 1 was melted at about 1,600° C. in the electric furnace, C and Ag (and at least one of Mn, Mo, V and Ti in some samples) were added. The molten scrap was held at a temperature within the range of 1,100 to 1,400° C. for at least 10 minutes. The scrap was then cooled to give ingots. The element concentration in the Fe-enriched layer of each ingot obtained in this way was analyzed in the same way as in Example 1. The result was tabulated in Table 3. When the Cu concentration in the Fe-enriched layer was 3% or below, iron having utility as the iron steel raw material could be recovered as shown in Table 3. Example 38 and Comparative Examples 4 and 5 in Table 3 used iron scrap that contained 10 mass % of Al. In Example 38 and in Comparative Example 4, the molten Al concentration was lowered to 0.5 mass % and 2 mass %, respectively, by oxygen blowing.

Incidentally, Sn and Pb among the impurity elements having affinity with Cu, belong to the group IVb, and Zn belongs to the Group IIb.

TABLE 3

| | Addition element increment (%) | | | Dissolution concen- tration (%) | Retention tempera- ture °C. | Element concentration at ingot upper part (%) | | | | | | | | | Fe/Cu sepa- ration | Cu- removing ratio (%) | Overall evaluation |
|---|---|---|---|---|---|---|---|---|---|---|---|---|---|---|---|---|---|
| | C | Cr | Ag | Al | | Cu | Sn | Pb | Zn | Cr | Ni | Mo | Fe | Ag | | | |
| Example | | | | | | | | | | | | | | | | | |
| 32 | 5 | — | — | — | 1306 | 2.9 | 0.004 | 0 | 0.13 | 0.08 | 0.14 | 0.01 | 96.7 | 0 | YES | 76 | ○ |
| 33 | 5 | 1 | — | — | 1183 | 1.7 | 0.003 | 0 | 0.12 | 0.08 | 0.14 | 0.01 | 97.9 | 0 | YES | 86 | ○ |
| 34 | 5 | — | 0.2 | — | 1305 | 0.8 | 0.002 | 0 | 0.06 | 0.08 | 0.14 | 0.01 | 98.9 | 0 | YES | 93 | ○ |
| 35 | 5 | 1 | 0.2 | — | 1264 | 0.5 | 0.001 | 0 | 0.06 | 0.08 | 0.14 | 0.01 | 99.2 | 0 | YES | 96 | ○ |
| 36 | 5 | 1 | 1 | — | 1149 | 0.4 | 0.001 | 0 | 0.04 | 0.08 | 0.14 | 0.01 | 99.3 | 0 | YES | 97 | ○ |
| 37 | 5 | 1 | 2 | — | 1161 | 0.1 | 0.001 | 0 | 0.04 | 0.08 | 0.14 | 0.01 | 99.6 | 0 | YES | 99 | ○ |
| 38 | 5 | 1 | — | 0.5 | 1328 | 1.7 | 0.004 | 0 | 0.12 | 0.08 | 0.14 | 0.01 | 97.9 | 0 | YES | 86 | ○ |
| Comp. Example | | | | | | | | | | | | | | | | | |
| 4 | 5 | 1 | — | 2 | 1226 | 4.5 | 0.004 | 0.01 | 0.14 | 0.08 | 0.14 | 0.01 | 95.1 | 0 | YES | 63 | x |
| 5 | 5 | 1 | — | 10 | 1282 | 11.1 | 0.045 | 0.03 | 0.23 | 0.07 | 0.12 | 0.01 | 78.4 | 0 | NO | 10 | x |

EXAMPLE 3

Ten tons of iron scrap of waste home electric appliances and scrap cars having the composition No. 3 in Table 4 were heated and melted to about 1,600° C. in an arc furnace. After C was added in the amounts tabulated in Table 5 (C and Ag in some samples), the molten scrap was held for 30 minutes at a temperature within the range of 1,100 to 1,400° C. After cooling, the element concentrations in the Fe-enriched layer were analyzed for the resulting ingots in the same way as in Example 1. The result was tabulated in Table 5. When the Cu concentration was 3% or below in the Fe-enriched layer, iron having utility as an iron or steel raw material could be recovered as tabulated in Table 5.

Incidentally, the term "REM" in Table 4 represents rare earth elements, and the concentration was calculated as the sum concentration of La, Ce, Pr and Nd.

Among the impurity elements having affinity with Cu, Sn belongs to the Group IVb, REM belongs to the Group IIIa, Au belongs to the Group Ib, Ga belongs to the Group IIIb, Bi belongs to the Group Vb and Pd does to the Group VIII.

As described above, the present invention adds C in a concentration higher than a predetermined concentration into the molten iron formed by melting the iron scrap, and separates the molten iron into the Fe-enriched layer having a small specific gravity and the Cu-enriched layer having a large specific gravity under the molten state. The present invention concentrates and precipitates Cu contained in the iron scrap as an unsuitable impurity for the steel material and the elements of the Groups IIIa, VIII, Ib, IIb, IIIb, IVb and Vb having affinity with Cu. Furthermore, the present invention separates these impurity elements under the molten state. Therefore, the present invention can execute the removing process efficiently, economically and within a short time.

The present invention adds the carbide forming elements such as Cr, Mn, Mo, Ti and V, besides C, in the suitable concentration ranges to form the carbides in the Fe-enriched layer. Furthermore, the present invention adds Ag in a predetermined concentration range to the molten steel or brings it into contact with the molten iron because Ag is hardly dissolved in iron under the molten state but absorbs only those elements, which are not preferable for the steel material, such as Cu and Sn. In this way, the present invention can provide a steel material having higher utility. The present invention can lower more reliably the concentrations of the impurity elements by removing Al, that impedes the separation between the Fe-enriched layer and the Cu-enriched layer, by oxidization refining in the stage where the scrap is molten. This oxidization refining operation can be carried out by blowing pure oxygen or air from a lance installed above the molten metal.

TABLE 4

| Scrap No. | C | Si | Mn | P | S | Cu | Sn | REM | Au | Ga | Bi | Pd |
|---|---|---|---|---|---|---|---|---|---|---|---|---|
| 3 | 0.1 | 0.12 | 0.6 | 0.04 | 0.04 | 16.2 | 0.05 | 0.03 | 0.25 | 0.07 | 0.13 | 0.01 |

(mass %)

In Example 3, the iron, from which Cu was removed to a Cu concentration of not higher than 3%, was recovered as the ingot. However, it is of course possible to recover the iron, Cu of which is removed to a concentration of not higher than 3% at a temperature of 1,100 to 1,300° C., under the molten state. In this instance, the Cu-enriched layer having a large specific gravity precipitates while the Fe-enriched layer having a small specific gravity exists at the upper part of the molten metal. Therefore, the Cu-enriched layer and the Fe-enriched layer can be separated when, for example, only the Cu-enriched layer is discharged from the furnace bottom to leave the molten metal of the Fe-enriched layer. Incidentally, in Examples 39 to 46 in Table 5, a large number of carbides that substantially do not contain Cu in the Fe-enriched layer exist under the dispersed state. This is obvious from the result of the analysis of the metallic structures of the samples of the Fe-enriched layer under the molten state that are collected in small amounts and are rapidly cooled after sample collection.

TABLE 5

| | Scrap | Addition element increment (%) | | | Retention temperature | Element concentration at ingot upper part (%) | | | | | | | | Fe/Cu separation | Cu-removing ratio (%) | overall evaluation |
|---|---|---|---|---|---|---|---|---|---|---|---|---|---|---|---|---|
| | No. | C | Cr | Ag | ° C. | Cu | Sn | REM | Au | Ga | Bi | Pd | Fe | | | |
| Example | | | | | | | | | | | | | | | | |
| 39 | 3 | 5 | — | — | 1229 | 2.7 | 0.003 | 0 | 0 | 0 | 0 | 0 | 97.3 | YES | 83 | ○ |
| 40 | 3 | 5 | 1 | — | 1191 | 2.5 | 0.003 | 0 | 0 | 0 | 0 | 0 | 97.5 | YES | 85 | ○ |

TABLE 5-continued

| Scrap No. | Addition element increment (%) | | | Retention temperature °C. | Element concentration at ingot upper part (%) | | | | | | | | Fe/Cu separation | Cu-removing ratio (%) | overall evaluation |
|---|---|---|---|---|---|---|---|---|---|---|---|---|---|---|---|
| | C | Cr | Ag | | Cu | Sn | REM | Au | Ga | Bi | Pd | Fe | | | |
| 41 | 3 | 5 | 5 | — | 1272 | 2.1 | 0.003 | 0 | 0 | 0 | 0 | 0 | 97.9 | YES | 87 | ○ |
| 42 | 3 | 5 | 7 | — | 1160 | 1.8 | 0.002 | 0 | 0 | 0 | 0 | 0 | 98.2 | YES | 89 | ○ |
| 43 | 3 | 10 | 10 | — | 1245 | 1.2 | 0.002 | 0 | 0 | 0 | 0 | 0 | 98.8 | YES | 93 | ○ |
| 44 | 3 | 15 | 15 | — | 1274 | 1.1 | 0.002 | 0 | 0 | 0 | 0 | 0 | 98.9 | YES | 93 | ○ |
| 45 | 3 | 5 | — | 0.05 | 1209 | 2.7 | 0.003 | 0 | 0 | 0 | 0 | 0 | 97.3 | YES | 83 | ○ |
| 46 | 3 | 5 | — | 0.15 | 1322 | 1.9 | 0.002 | 0 | 0 | 0 | 0 | 0 | 98.1 | YES | 88 | ○ |
| Comp. Example | | | | | | | | | | | | | | | | |
| 6 | 3 | 0.3 | — | — | 1167 | 16.2 | 0.050 | 0.03 | 0.25 | 0.07 | 0.13 | 0.01 | 83.3 | NO | 0 | x |
| 7 | 3 | 2 | — | — | 1175 | 7.9 | 0.004 | 0 | 0.01 | 0 | 0 | 0 | 92.1 | YES | 51 | x |

What is claimed is:

1. A method of melt-removing impurity elements from iron, comprising the steps of:
    melting an iron scrap having a composition comprising iron and iron-soluble elements in the sum of 100 mass %, and containing Cu and unavoidable impurities, in an oxygen-containing atmosphere;
    adding C to said molten iron with the range of C defined by the formula $5.0\times(1-Cu/100) \leq C \leq 20$, wherein Cu and C are mass %;
    separating said molten iron into an Fe-enriched layer and a Cu-enriched layer under the molten state;
    separating Cu contained in said iron scrap and precipitating Cu into said Cu-enriched layer by utilizing the difference of the specific gravity between said layers; and
    removing Cu from said Fe-enriched layer.

2. A method of melt-removing impurity elements from iron, according to claim 1, wherein 0.1 to 30 mass % of Ag on the basis of the total mass of said molten iron is further added to, or is brought into contact with, said molten iron.

3. A method of melt-removing impurity elements from iron, according to claim 1, wherein, after said molten iron is separated into said Fe-enriched layer and said Cu-enriched layer under the molten state, only said Fe-enriched layer is transferred to another vessel, or said Cu-enriched layer is discharged outside a vessel, and then 0.1 to 30 mass % of Ag on the basis of the total mass of said molten iron is further added to, or is brought into contact with, said molten iron.

4. A method of melt-removing impurity elements from iron, according to claim 1, wherein oxygen is added into said molten iron, and Al is oxidized and removed to a range of not greater than 1 mass %.

5. A method of melt-removing impurity elements from iron, according to claim 1, wherein 0.1 to 30 mass % of Ag on the basis of the total mass of said molten iron is further added to, or is brought into contact with, said molten iron, oxygen is added into said molten iron, and Al is oxidized and removed to a range of not greater than 1 mass %.

6. A method of melt-removing impurity elements from iron, according to claim 1, wherein, after said molten iron is separated into said Fe-enriched layer and said Cu-enriched layer under the molten state, only said Fe-enriched layer is transferred to another vessel, or said Cu-enriched layer is discharged outside a vessel, 0.1 to 30 mass % of Ag on the basis of the total mass of said molten iron is further added to, or is brought into contact with, said molten iron, oxygen is added into said molten iron, and Al is oxidized and removed to a range of not greater than 1 mass %.

7. A method of melt-removing impurity elements from iron, according to claim 1, wherein said molten iron is stirred.

8. A method of melt-removing impurity elements from iron, according to claim 1, wherein said iron scrap is melted in an electric furnace, and then Cu and the elements of the Groups IIIa, VIII, Ib, IIb, IIIb, IVb and Vb having affinity with Cu are melt-removed inside said furnace.

9. A method of melt-removing impurity elements from iron, according to claim 1, wherein said iron scrap is melted in a cupola furnace.

10. A method of melt-removing impurity elements from iron, comprising the steps of:
    melting an iron scrap having a composition comprising iron and iron-soluble elements in the sum of 100 mass %, and containing Cu and unavoidable impurities, in an oxygen-containing atmosphere;
    adding C and at least one of Cr and Mo to said molten iron with the range of C defined by the formula $3.3\times(1-Cu/100) \leq C \leq 20$, with the range of Cr defined by the formula $4.5\times(1-Cu/100) \leq Cr \leq 30$; with the range of Mo defined by the formula $4.5\times(1-Cu/100) \leq Mo \leq 30$; wherein Cu, C, Cr and Mo are mass %;
    separating said molten iron into an Fe-enriched layer and a Cu-enriched layer under the molten state;
    separating Cu contained in said iron scrap and precipitating Cu into said Cu-enriched layer by utilizing the difference of the specific gravity between said layers; and
    removing Cu from said Fe-enriched layer.

11. A method of melt-removing impurity elements from iron, comprising the steps of:
    melting an iron scrap having a composition comprising iron and iron-soluble elements in the sum of 100 mass %, and containing Cu and unavoidable impurities, in an oxygen-containing atmosphere;
    adding C and at least one of Mn, V and Ti to said molten iron with the range of C defined by the formula $4.3\times(1-Cu/100) \leq C \leq 20$; with the range of Mn defined by the formula $4.0\times(1-Cu/100) \leq Mn \leq 30$; with the range of V defined by the formula $4.0\times(1-Cu/100) \leq V \leq 30$; with the range of Ti defined by the formula $4.0\times(1-Cu/100) \leq Ti \leq 30$; wherein Cu, C, Mn, V and Ti are in mass %;
    separating said molten iron into an Fe-enriched layer and a Cu-enriched layer under the molten state;
    separating Cu contained in said iron scrap and precipitating Cu into said Cu-enriched layer by utilizing the difference of the specific gravity between said layers; and removing Cu from said Fe-enriched layer.

12. A method of melt-removing impurity elements from iron, comprising the steps of:

melting an iron scrap having a composition comprising iron and iron-soluble elements in the sum of 100 mass %, and containing Cu and unavoidable impurities, in an oxygen-containing atmosphere;

adding C, at least one of Cr and Mo, and at least one of Mn, V and Ti to said molten metal with the range of C defined by the formula $3.3 \times (1-Cu/100) \leq C \leq 20$; with the range of Cr defined by the formula $4.5 \times (1-Cu/100) \leq Cr \leq 30$; with the range of Mo defined by the formula $4.5 \times (1-Cu/100) \leq Mo \leq 30$; with the range of Mn defined by the formula $4.0 \times (1-Cu/100) \leq 30$; with the range of Ti defined by the formula $4.0 \times (1-Cu/100) \leq Ti \leq 30$; with the range of V defined by the formula $4.0 \times (1-Cu/100) \leq V \leq 30$, wherein Cu, C, Cr, Mo, Mn, Ti and V are mass %;

separating said molten iron into an Fe-enriched layer and a Cu-enriched layer under the molten state;

separating Cu contained in said iron scrap and precipitating Cu into said Cu-enriched layer by utilizing the difference of the specific gravity between said layers; and removing Cu from said Fe-enriched layer.

13. A method of melt-removing impurity elements from iron, comprising the steps of:

melting an iron scrap having a composition comprising iron and iron-soluble elements in the sum of 100 mass %, and containing Cu, elements of the Groups IIIa, VIII, Ib, IIb, IIIb, IVb and Vb having affinity with Cu, and unavoidable impurities, in an oxygen-containing atmosphere;

adding C to said molten iron with the range of C defined by the formula $5.0 \times (1-Cu/100) \leq C \leq 20$, wherein Cu and C are mass %;

separating said molten iron into an Fe-enriched layer and a Cu-enriched layer under the molten state;

separating Cu and said elements of the Groups IIIa, VIII, Ib, IIb, IIIb, IVb and Vb having affinity with Cu, contained in said iron scrap, and precipitating Cu and the elements of the Groups IIIa, VIII, Ib, IIb, IIIb, IVb and Vb having affinity with Cu into said Cu-enriched layer by utilizing the difference of the specific gravity between said layers; and removing Cu and the elements of the Groups IIIa, VIII, Ib, IIb, IIIb, IVb and Vb having affinity with Cu from said Fe-enriched layer.

14. A method of melt-removing impurity elements from iron, comprising the steps of:

melting an iron scrap having a composition comprising iron and iron-soluble elements in the sum of 100 mass %, and containing Cu, elements of the Groups IIIa, VIII, Ib, IIb, IIIB, IVb and Vb having affinity with Cu, and unavoidable impurities, in an oxygen-containing atmosphere:

adding C and at least one of Cr and Mo to said molten iron with the range of C defined by the formula $3.3 \times (1-Cu/100) \leq C \leq 20$; with the range of Cr defined by the formula $4.5 \times (1-Cu/100) \leq 30$; with the range of Mo defined by the formula $4.5 \times (1-Cu/100) \leq Mo \leq 30$; wherein Cu, C, Cr and Mo are mass %;

separating said molten iron into an Fe-enriched layer and a Cu-enriched layer under the molten state;

separating Cu and said elements of the Groups IIIa, VIII, Ib, IIb, IIIb, IVb and Vb having affinity with Cu, contained in said iron scrap, and precipitating Cu and the elements of the Groups IIIa, VIII, Ib, IIb, IIIb, IVb and Vb having affinity with Cu into said Cu-enriched layer by utilizing the difference of the specific gravity between said layers; and removing Cu and the elements of the Groups IIIa, VIII, Ib, IIb, IIIb, IVb and Vb having affinity with Cu from said Fe-enriched layer.

15. A method of melt-removing impurity elements from iron, comprising the steps of:

melting an iron scrap having a composition comprising iron and iron-soluble elements in the sum of 100 mass %, and containing Cu, elements of Groups IIIa, VIII, Ib, Iib, IIIb, IVb and Vb having affinity with Cu, and unavoidable impurities, in an oxygen-containing atmosphere;

adding C and at least one of Mn, V and Ti, to said molten iron with the range of C defined by the formula $4.3 \times (1-Cu/100) \leq C \leq 20$; with the range of Mn defined by the formula $4.0 \times (1-Cu/100) \leq Mn \leq 30$; with the range of V defined by the formula $4.0 \times (1-Cu/100) \leq V \leq 30$; with the range of Ti being defined by the formula $4.0 \times (1-Cu/100) \leq Ti \leq 30$; wherein Cu, C, Mn, V and Ti are mass %;

separating said molten iron into Fe-enriched layer and a Cu-enriched layer under the molten state;

separating Cu and said elements of the Groups IIIa, VIII, Ib, IIb, IIIb, IVb and Vb having affinity with Cu, contained in said iron scrap, and precipitating Cu and the elements of the Groups IIIa, VIII, Ib, IIb, IIIb, IVb and Vb having affinity with Cu into said Cu-enriched layer by utilizing the difference of the specific gravity between said layers; and removing Cu and the elements of the Groups IIIa, VIII, Ib, IIb, IIIb, IVb and Vb having affinity with Cu from said Fe-enriched layer.

16. A method of melt-removing impurity elements from iron, comprising the steps of:

melting an iron scrap having a composition comprising iron and iron-soluble elements in the sum of 100 mass %, and containing Cu, elements of the Groups IIIa, VIII, Ib, IIb, IIIb, IVb and Vb having affinity with Cu, and unavoidable impurities, in an oxygen-containing atmosphere;

adding C, at least one of Cr and Mo, and at least one of Mn, V and Ti to said molten iron with the range of C defined by the formula $3.3 \times (1-Cu/100) \leq C \leq 20$; with the range of Cr defined by the formula $4.5 \times (1-Cu/100) \leq Cr \leq 30$; with the range of Mo defined by the formula $4.5 \times (1-Cu/100) \leq Mo \leq 30$; with the range of Mn defined by the formula $4.0 \times (1-Cu/100) \leq Mn \leq 30$, with the range of Ti defined by the formula $4.0 \times (1-Cu/100) \leq Ti \leq 30$; with the range of V defined by the formula $4.0 \times (1-Cu/100) \leq V \leq 30$, wherein Cu, C, Cr, Mo, Mn, Ti and V are mass %;

separating said molten iron into an Fe-enriched layer and a Cu-enriched layer under the molten state;

separating Cu and said elements of the Groups IIIa, VIII, Ib, IIb, IIIb, IVb and Vb having affinity with Cu, contained in said iron scrap, and precipitating Cu and the elements of the Groups IIIa, VIII, Ib, IIb, IIIb, IVb and Vb having affinity with Cu into said Cu-enriched layer by utilizing the difference of the specific gravity between said layers; and removing Cu and the elements of the Groups IIIa, VIII, Ib, IIb, IIIb, IVb and Vb having affinity with Cu from said Fe-enriched layer.

17. A method of melt-removing impurity elements from iron according to claim 12 wherein the range of added C is defined by the formula $4.3 \times (1-Cu/100) \leqq C \leqq 20$.

18. A method of melt-removing impurity elements from iron according to claim 16 wherein the range of the added C is defined by the formula $4.3 \times (1-Cu/100) \leqq C \leqq 20$.

* * * * *